US012734106B2

(12) United States Patent
Patel

(10) Patent No.: US 12,734,106 B2
(45) Date of Patent: Sep. 15, 2026

(54) MASSAGER WITH SINGLE ROD ECCENTRIC DRIVE MECHANISM TO PROVIDE SYNCHRONIZE WAVE OSCILLATION TREATMENT

(71) Applicant: UMA INNOVATIVE MANUFACTURING COMPANY, Gujarat (IN)

(72) Inventor: Baldevbhai Ramanlal Patel, Gujarat (IN)

(73) Assignee: UMA INNOVATIVE MANUFACTURING COMPANY, Gujarat (IN)

( * ) Notice: Subject to any disclaimer, the term of this patent is extended or adjusted under 35 U.S.C. 154(b) by 455 days.

(21) Appl. No.: 18/037,017

(22) PCT Filed: Feb. 24, 2022

(86) PCT No.: PCT/IN2022/050158

§ 371 (c)(1),
(2) Date: May 15, 2023

(87) PCT Pub. No.: WO2022/180643

PCT Pub. Date: Sep. 1, 2022

(65) Prior Publication Data

US 2024/0016694 A1 Jan. 18, 2024

(30) Foreign Application Priority Data

Feb. 25, 2021 (IN) ............................ 202121007916

(51) Int. Cl.

| | |
|---|---|
| ***A61H 23/00*** | (2006.01) |
| ***A61H 23/02*** | (2006.01) |
| ***A61H 39/04*** | (2006.01) |

(52) U.S. Cl.
CPC ....... *A61H 23/006* (2013.01); *A61H 23/0254* (2013.01); *A61H 39/04* (2013.01);
(Continued)

(58) Field of Classification Search
CPC ................. A61H 23/006; A61H 1/008; A61H 1/0292; A61H 23/00; A61H 7/004–005;
(Continued)

(56) References Cited

U.S. PATENT DOCUMENTS 1,276,526 A * 8/1918 Hardy et al. ........... A61H 1/008
601/103
1,303,475 A * 5/1919 Hardy et al. ....... A61H 23/0254
601/93

(Continued)

FOREIGN PATENT DOCUMENTS

CN 204600034 U * 9/2015
CN 105560028 A 5/2016

(Continued)

OTHER PUBLICATIONS

English translation for CN 110934730, machine translated by espacenet.com.*

(Continued)

*Primary Examiner* — Tu A Vo
(74) *Attorney, Agent, or Firm* — MacCord Mason PLLC

(57) ABSTRACT

The present invention provides a massager with single rod eccentric drive mechanism to provide synchronize wave oscillation treatment. A single rod eccentric drive mechanism provides a wave oscillation motion and heating massage in bed and chairs. The massager includes motors at proximal end of the shaft which accompanied through the plurality of cam assembly and bearing respectively. A timing belt pulley is at distal end of massager to regulate frequency of massage. The arrangement of angular grooved shaft and
(Continued)

cam assembly provides lateral conversion of axial rotation movement of shaft in to eccentric movement at the differently positioned cam at regular interval. The cam assembly accompanied with the needle roller housing is at different vertical position, while the rotation of shaft in one circle is equal to 0-360° the cam assembly is arranged in ascending angles like 0°, 45°, 90°, 135°, 180°, 225°, 270°, 315°. The user will be lift on stationary knob adjacent to movable knobs during the operation.

7 Claims, 12 Drawing Sheets

(52) U.S. Cl.
CPC ................ *A61H 2201/0142* (2013.01); *A61H 2201/0149* (2013.01); *A61H 2201/0192* (2013.01); *A61H 2201/0207* (2013.01); *A61H 2201/1215* (2013.01); *A61H 2201/1418* (2013.01); *A61H 2201/1454* (2013.01); *A61H 2201/1463* (2013.01); *A61H 2201/149* (2013.01); *A61H 2201/1623* (2013.01); *A61H 2201/164* (2013.01); *A61H 2201/5005* (2013.01); *A61H 2205/081* (2013.01); *A61H 2205/106* (2013.01); *A61H 2205/108* (2013.01); *A61H 2205/12* (2013.01)

(58) Field of Classification Search
CPC ............ A61H 15/0078–0085; A61H 23/0254; A61H 39/04; A61H 2201/0142; A61H 2201/0149; A61H 2201/0192; A61H 2201/0207; A61H 2201/1215; A61H 2201/1418; A61H 2201/1454; A61H 2201/1463; A61H 2201/149; A61H 2201/1623; A61H 2201/164; A61H 2201/5005; A61H 2205/081; A61H 2205/106; A61H 2205/108; A61H 2205/12; A61H 2023/0272; A61H 2201/1664; B60N 2/976
See application file for complete search history.

(56) References Cited

U.S. PATENT DOCUMENTS 1,375,652 A * 4/1921 Carlotti .............. A61H 15/0078 91/25
1,617,593 A * 2/1927 Hardy .................... A61H 23/02 601/97
1,999,412 A * 4/1935 Hardy .................... A61H 23/02 606/239
2,186,105 A * 1/1940 Hall .................... A61H 23/0254 601/111
2,360,975 A * 10/1944 Petersen ................ A61H 23/02 601/97
2,445,158 A * 7/1948 Sparhawk ............ A61G 7/0573 5/617
2,652,826 A * 9/1953 Kallmeyer ........... A61H 9/0078 601/134
2,672,860 A * 3/1954 Badger .................. A61H 23/04 601/149
2,773,498 A * 12/1956 Himmelman ...... A61H 15/0078 5/934
3,298,363 A * 1/1967 Parkin .................... A61H 1/001 5/934
3,656,190 A * 4/1972 Regan .................. A61G 7/0573 5/613
4,085,738 A * 4/1978 Kodera .................... A61B 5/00 600/557
4,469,093 A * 9/1984 Chaplar ............... A61G 13/009 601/111
4,682,771 A * 7/1987 Jean ......................... B62M 3/08 601/111
4,999,861 A * 3/1991 Huang ................. A61G 7/0573 601/51
5,092,315 A * 3/1992 Bennett .................... A61H 1/00 601/93
8,011,044 B1 * 9/2011 Jones ................. A61H 23/0254 297/284.3
11,540,970 B2 * 1/2023 Chen .................... A61H 23/006
2004/0215113 A1 * 10/2004 Saringer .............. A61G 7/0573 601/103
2007/0083134 A1 * 4/2007 Ganti ................... A61H 23/006 601/103
2007/0287939 A1 * 12/2007 Kim ....................... A63B 22/16 601/35
2012/0101517 A1 * 4/2012 Kang ..................... A61H 39/04 606/204
2017/0196300 A1 * 7/2017 Huang ................. A61H 23/006
2022/0062094 A1 * 3/2022 Chen .................... A61H 23/006

FOREIGN PATENT DOCUMENTS

CN 106214464 A * 12/2016 ............. A47K 3/022
CN 108938374 A * 12/2018 ............. C22C 38/44
CN 109125030 A 1/2019
CN 109223473 A * 1/2019 ............. A61H 7/004
CN 109288635 A * 2/2019 ............. A61G 7/005
CN 208905791 U 5/2019
CN 209048619 U * 7/2019
CN 110934730 A * 3/2020 ............. A61H 23/02
CN 111000713 A * 4/2020 ............. H02K 7/116
CN 111870505 A * 11/2020 ........... A61N 5/0613
CN 212369268 U * 1/2021 ............. A61H 23/02
GB 417550 A * 10/1934 ............. A61H 23/04
GB 531088 A * 12/1940 ......... A61H 23/0254
GB 2267821 A * 12/1993 ............. A47C 7/004
IN 201721012744 A 5/2017
KR 200302954 Y1 * 2/2003 ............. A61H 1/008
KR 20030064460 A * 8/2003 ............. A61H 39/04
KR 20070034404 A * 3/2007 ............. A61H 39/04
KR 200444771 Y1 * 6/2009 ............. A61H 39/04
KR 20120012186 A * 2/2012 ........... A61H 23/006
KR 101241415 B1 * 3/2013 ............... A61H 7/00
KR 20150040600 A * 4/2015 ........... A61H 1/0218
KR 101906848 B1 * 12/2018 ............... A61F 7/08
WO WO-2020032500 A1 * 2/2020 ............. A61H 39/04

OTHER PUBLICATIONS

English translation for KR 20030064460, machine translated by espacenet.com.*
English translation for CN 108938374, machine translated by espacenet.com.*
International Search Report for corresponding PCT Application No. PCT/IN2022/050158 dated May 5, 2022.

* cited by examiner

MASSAGER WITH SINGLE ROD ECCENTRIC DRIVE MECHANISM TO PROVIDE SYNCHRONIZE WAVE OSCILLATION TREATMENT

CROSS-REFERENCE TO RELATED APPLICATIONS

This application is a U.S. National Phase Application of PCT/IN2022/050158, filed Feb. 24, 2022, which claims priority to Indian Patent Application number 202121007916, filed on Feb. 25, 2021, the contents of both applications are incorporated herein by reference in their entireties.

FIELD OF INVENTION

The present invention relates to a massager with single rod eccentric drive mechanism to provide synchronize wave oscillation treatment and more particularly the invention relates to bed and chairs massager in contact with the human body having heating massage and wave generating mechanisms incorporated therein.

BACKGROUND OF INVENTION

Massage is the manipulation of subject muscles and soft tissues in order to affect a release of tension. Massage involves many strategies, including kneading and stretching muscles, percussive striking, and vibration. Massage is well muscles, percussive striking, and vibration. Massage is well therapy physiotherapy and fitness. Massage is practiced universally around the globe, both professionally and personally, and is recognized as providing some benefits to the mental, emotional and physical health of those receiving it.

In light of the almost universal appeal and recognition of massage, many different styles of massage have been developed, ranging from Shiatsu, Swedish, Deep Tissue, and others, and tools to aid in massage have developed in each discipline. One such tool is known as a massage roller or foam roller. Foam Rollers are cylindrical or semi-cylindrical bodies made of a compliant material, such as foam, which are used for massaging and stretching soft tissues, increasing circulation, reducing pain, tension and stress from the soft tissues, improving posture and alignment, increase spinal mobility. Core and corrective exercises can be used with the roller as well.

Although a variety of massaging apparatus performing various massaging operations as well as the kneading massage have been suggested, such massaging apparatus generally have a complicated structure in the drive system of massaging members or in the control program for performing various massaging operations and, hence, are large in size and expensive.

The Indian patent application Number 201721012744 describing a magnetic acupressure board for relieving back pain. A magnetic acupressure board has a plurality of knobs extending upwardly there from the base which are positioned within outlines of average shoulder, spine and pelvic area of humans. The knobs are positioned at reflex points for attaining acupressure treatment when the user sleeps on the same. Each knob contains the magnetic button at the top which provides synergistic effect in pain relief with acupressure. The user can adjust the height of the knobs by adjusting the bolt to create greater pressure on the needed reflex points and have more intense massage therapy at specific location. The device includes adjustments and modules to be compatible with all sizes, shapes, and varied health conditions of humans. The mechanism is working on static mode. The knob mentioned in the prior art are static which can cause discomfort to the patient especially where the application of pressure for longer period of time Another Prior art CN208905791 discloses a bed board is horizontally and fixedly installed at the upper end of a supporting column, and the upper end of a first transmission rod and the upper end of a second transmission rod are hinged to the bottom face of a massage board. A bracket is horizontally arranged on the side wall of the massage plate in a sliding manner and the upper end of a vertical sliding rod is fixed on the bottom surface of the bracket. A square hole vertically corresponding to the massage plate is formed in the bed plate, a plurality of clamping grooves are evenly formed in the lower bottom face of the leg plate, and the clamping grooves are distributed at equal intervals in the length direction of the leg plate. A supporting rod of which the upper end is clamped in the clamping groove is rotationally arranged on the bed plate. According to the massage bed, the first transmission rod and the second transmission rod drive the massage plate to massage a person lying on the bed board through rotation of the driving rotating wheel and the driven rotating wheel, back-and-forth movement of the massage rotating roller conducts rubbing type massage on the back of the human body. Such mechanism has limited adjustability, area of treatment and weak pressure point.

Further, the above mentioned prior arts are very complex and employ straps or girding means on the body at specific locations for generating the necessary opposing forces to the pressure applicator. Such straps can cause discomfort to the patient.

Additionally, conventional bed or mat type massage devices provide basic reciprocating motions of massage bumps, which apply pressure on the body of a patient, along the body. The massage devices of prior art have a disadvantage that it cannot provide massaging that considers detailed curvatures of various patients. Each human being has a different height, weight and body surface curvature. However, massage devices of prior art provide a simple linear massage motion that resembles the curve of a human backbone. Springs, cushions or links were used to accommodate the deviations from the simple reciprocating massage motion. However, such means did not effectively provide therapeutic massage effect, or acupressure.

Further, due to rough massaging motions of massage bumps, which do not accommodate precise human body shapes, pains were induced to the user of the massage devices. Also, there are medically important points on the human body, on which heating and acupressure treatment should be concentrated. While the positions of the points and intensity of treatments are different from patient to patient, conventional massage devices did not provide customized massaging motion that is controllable to meet such requirements.

Overall, the present invention has been accomplished in view of the above circumstances, and it is to provide a massager with single rod eccentric drive mechanism to provide synchronize wave oscillation treatment which can perform, as well as the kneading massage, other massaging embodiments with a less complicated Structure, and massaging operations incorporating such mechanism.

The main aim of the present invention is to massage the back of the body, waist and the vertebra portion of human body especially person in middle and old age is an of paramount importance part in all massage positions. It also reduce back pain/body pain by massaging human body that can provide massaging motion adapted to different height and width of individual human bodies.

OBJECT OF THIS INVENTION

The main object of the present invention is to provide massage device that allows a person/patient/human/user to be massaged automatically.

The further object of the present invention is to provide a mechanism that can be used for generating synchronize wave oscillation motion in beds and chairs.

The other object of the present invention is to provide to resist the person/patient/human/user tensing, thereby promoting his relaxation.

Yet another object of the present invention is to provide a long lasting relief from back/body/whole pain and leg pain in different physiology despite of size and shape of different individuals.

The another object of the present invention is to provide a device for reliving back/body/whole pain and leg pain in easy, simple yet effective, side effect free and economical manner.

A still further object of the present invention is to provide a device to improve the function of muscles, joints, or use to help circulation of blood.

A still further object of the present invention is to provide a massaging and oscillating device which is capable to provide the heat massage, magnetic effect and acupressure massage to user/human/person/patient like a real professional.

SUMMARY OF THE INVENTION

The present invention provides a massager with single rod eccentric drive mechanism to provide synchronize wave oscillation treatment. A single rod eccentric drive mechanism provides a wave oscillation motion and heating massage in bed and chairs. The massager includes motors at proximal end of the shaft which accompanied through the plurality of cam assembly and bearing respectively. A timing belt pulley is at distal end of massager to regulate frequency of massage. The arrangement of angular grooved shaft and cam assembly provides lateral conversion of axial rotation movement of shaft in to eccentric movement at the differently positioned cam at regular interval. The cam assembly accompanied with the needle roller housing is at different vertical position, while the rotation of shaft in one circle is equal to 0°-360° the cam assembly is arranged in ascending angles like 0°, 45°, 90°, 135°, 180°, 225°, 270°, 315°. The user will be lift on stationary knob adjacent to movable knobs during the operation.

STATEMENT OF THE INVENTION

A massager with single rod eccentric drive mechanism to provide synchronize wave oscillation treatment comprises a driving means includes at least one motor to provide working force in the device; at least one gear to corresponding motor shaft, at least one timing pulley to guide the corresponding shaft in the device a rotating means includes at least one shaft with serial repetitive arrangement of ring and at least one angular groove slanted at one specific degree; at least one cam assembly with two corresponding half circular joint to establish on the slanted angular groove to complete cam assembly; at least one bearing to accommodate at ring of shaft at least one needle roller housing with dedicated roller in the close proximity to corresponding cam assembly at specific position, a massaging means includes at least one knobs to provide percussive massage on body, at least one linear leaver to pivotal mounted with and dome bush, a supportive means includes the base strip to accommodate bearing and needle roller housing at regular interval through column, at least one housing to selectively accommodate device in conjugation with board, at least one board having static and or heating knobs to lift the body at one position, wherein the angular grooved shaft in the conjugation with cam assembly and needle roller housing specifically provide conversion of axial rotational movement of motor driven shaft to eccentric vertical movement in the form of synchronize percussive wave oscillation treatment through relatively different vertical position of knobs on the upper side of board.

BRIEF DESCRIPTION OF THE DRAWINGS

Aforementioned aspect and the advantage of the present invention will be more fully understood after reading implementation below and after with reference to schema, in the drawings:

FIG. 1(*c*) is a sectional view of a needle, needle roller housing and cap used in the shaft of FIG. 1(*b*).

DETAILED DESCRIPTION OF INVENTION

Before explaining the present invention in detail, it is to be understood that the invention is not limited in its application. The nature of invention and the manner in which it is performed is clearly described in the specification. The invention has various components and they are clearly described in the following pages of the complete specification. It is to be understood that the phraseology and terminology employed herein is for the purpose of description and not of limitation.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure.

It is to be noted that the "single rod eccentric drive mechanism" is made up of strong and durable nylon plastic. Also, it is to be noted that the strength and utility suitable plastics has been used. Furthermore, Delrin is used for the hardness in the operation; M.O.S-2 is used for the smoothness and for strong operational requirement nylon plastic. For other embodiment of the present invention, T.P.E is used for rubber softness and poly carbonate is used for transparent plastic. Nylon plastic has been safely used for many years and concluded that the utility and strength related plastic products do not pose health risk to customers/users. In present invention shaft/single rod mechanism is made up of strong and durable nylon plastic. The nylon plastic according to the present invention, lift 10 kg weight per one unit, in present invention there is total 16 units, so it can easily lift weight up to 160 kg of the user/person/human/patient.

Figure 1:
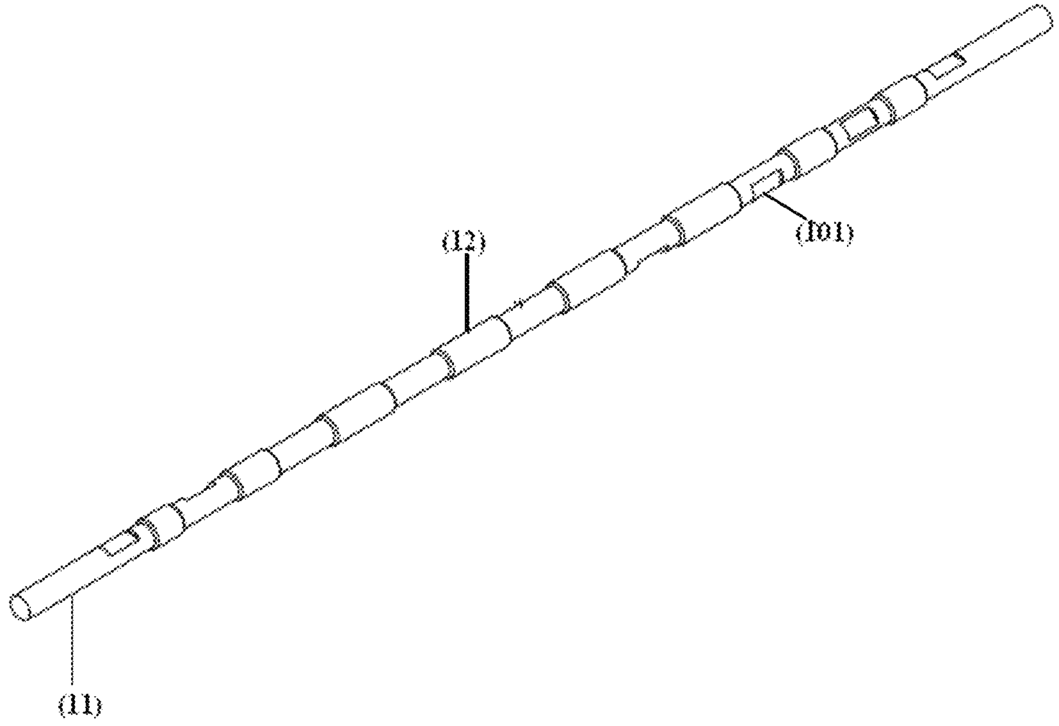
FIG. 1(*a*) is an enlarged view of a shaft as preferred embodiment of the present invention FIG. 1(*b*) is a breakaway and sectional view of a cam parts are cemented on shaft of FIG. 1(*a*) and used for generating oscillation wave according to the present invention. The breakaway system shows two half semi circular cam assembly buttons need to be cemented on the angular grooved shaft.
Figure 1B:
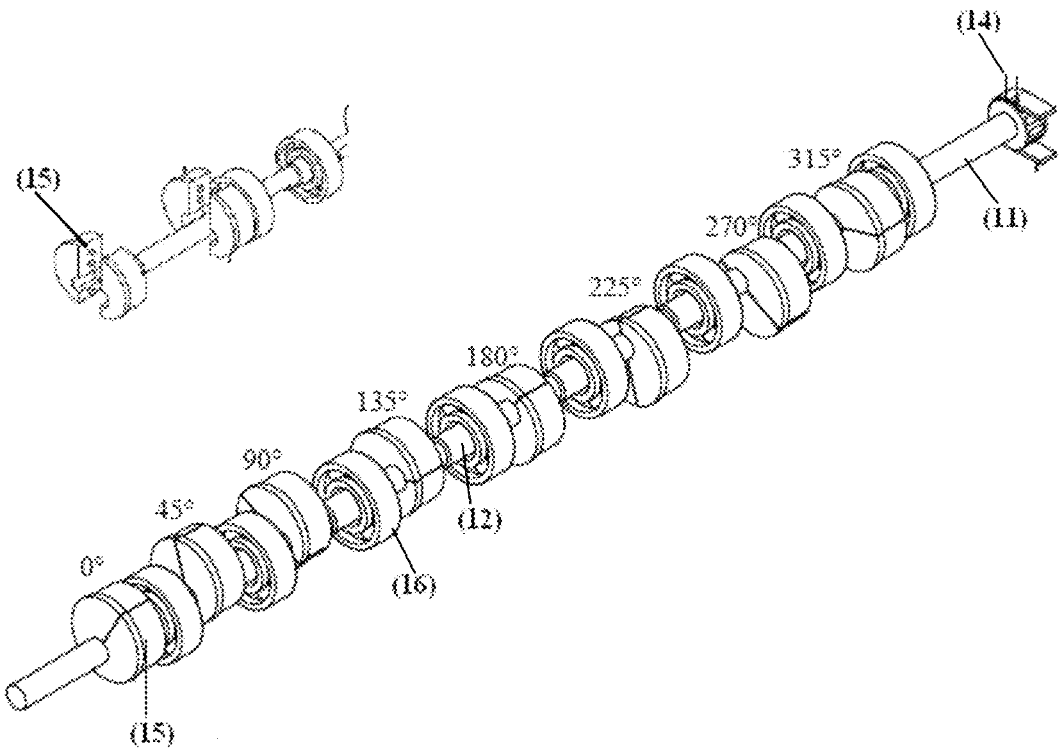
Figure 1C:
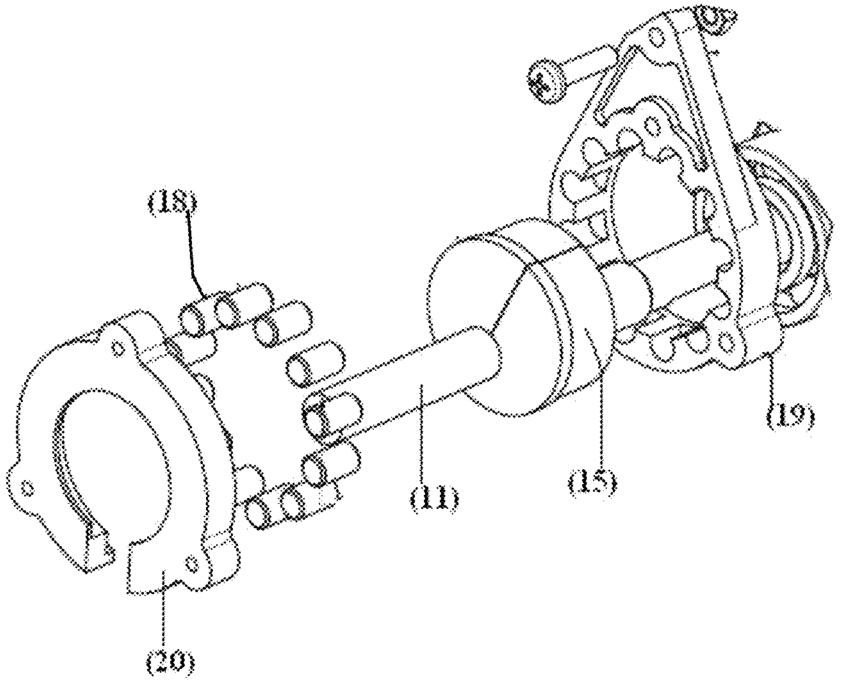

FIG. 1(*a*) illustrates skeleton structure of the shaft (11) for respective eccentric rotational movement of the knobs in the present invention. The present invention comprises a shaft (11) with different slanted angular grooves (101) and a ring (12) on single linear structure in the system. The shaft (11) is constructed from a nylon plastic that is strong enough to withstand the weight of the user. In preferred embodiment material is selected with view to basic characteristics like weight, portability, utility, durability and strength. The shaft (11) is made up of any suitable size and varied as per the ultimate requirement of the user.

As shown in FIG. 1(*a*), the shaft (11) has plurality of the ring (12) and plurality of angular grooves (101) in serial succeeding repeated position. The ring (12) length are different in size on the shaft (11), the middle rings (12) width are larger in size than the rings (12) on the end of the shafts (11). The middle rings (12) need to bear more load capacity and vice versa during rotation as the linear system. In preferred embodiment, the ring (12) holds plurality of a bearing (16) with the angular grooves (101) on the shaft (11) hold a cam assembly (15). The repetitive arrangement of ring (12) and angular grooves (101) provides load bearing capacity for linear arrangement in massage operation. The main object of present invention i.e. single rod synchronize massage is depended on the definite rotation of the shaft with the motor.

FIG. 1(*b*) describes the snap fit arrangement of the cam (15) on the angular grooves (101) and a bearing (16) arranged in serial repetitive manner, which is designed to carry specific types of loads, radial or thrust, the bearings (16) serve to reduce friction and allow for smoother rotation of shaft (11) movement. This is the single most important function of the bearings (16) which supports the cam assembly (15) for easy rotating of the shaft (11). The cam parts had shown in FIG. 1(*b*) that easily fixed on the shaft (11) by firmly fixing on the slanted groove with snap fit dual counter parts. The fixation of the two part cam assembly (15) has done by firm cementing at particular angle with two part snap fit arrangement between corresponding grooves of cam parts. The said firm arrangement provides conversion of axial movement of shaft (11) to eccentric movement of cam assembly (15) due to slanted groove arrangement. The shaft (11) and all allied assemblies rotate by drive motor along with gear (103) box. The specific arrangement provides reduction in the speed but thrust will be increased proportionately that will ultimately provides force at user through knobs.

The preferred embodiment is configured in such way that it will create drive kind of movement of back massage/whole body device, this movement is provided by a motor (13). The proximal end of the shaft (11) is accommodating with the motor (13) and the distal end hold a timing pulley (14) or timing belt as shown in FIG. 1(*b*); so that rotational motion of the shaft (11) is converted in to both up and down movement which is translated into synchronize wave oscillation treatment with regards to specific position of cam assembly (15).

FIG. 1(*b*) describes the breakaway and enlarged view of preferred embodiment of the present invention where the cam assemblies (15) are arranged in ascending angles like 0°, 45°, 90°, 135°, 180°, 225°, 270°, 315° on the shaft (11) through fixing at different angular slanted position. In 2D diagram of FIG. 1(*a*) some of the angular grooves (101) of cam assembly (15) are visible like 0°, 180°, 225°, 270° and 315°. In other embodiment, the range of angle has been adjustable as per requirement of user. To decrease the range of angle than it's arranged in ascending angles like 90°, 180°, 270°, 360° and to increase the range of angle than it's arranged as 22.5°, 45°, 67.5°, 90°, 112.5°, 135° and 157.2°, 180°, 225°, 270°, 315. The distance (angle) and pattern of cam assembly (15) is varied as per the ultimate requirement of the massage. It provides easy and simple way to adjust the position and heights as per the user requirement.

FIG. 1(*c*) describes enlarged single cam exploded view of the 0° cam assembly (15) with a needle roller housing (19) which needs to be mounted on the shaft (11). In said FIG. 1(*c*), the proximal end show a cap (20) of the needle roller housing (19) which need to be fixed with the needle roller housing (19) accommodating the corresponding cam assembly (15). The needle roller housing (19) has a needle groove in which a needle (18) kept for the free rotation when assembly has closed to accommodate cam assembly (15) with the cap (20). The close proximity arrangement of cam assembly (15) and rotating needles in the needle groove provides the smooth and noise free axial rotational movement of the shaft (11). The needle (18), needle roller housing (19) and cap (20) are also made up of strong and durable nylon, ABS plastic or delrin, so that can easily carry the weight and it is strong enough to withstand the weight of the user.

Figure 2:
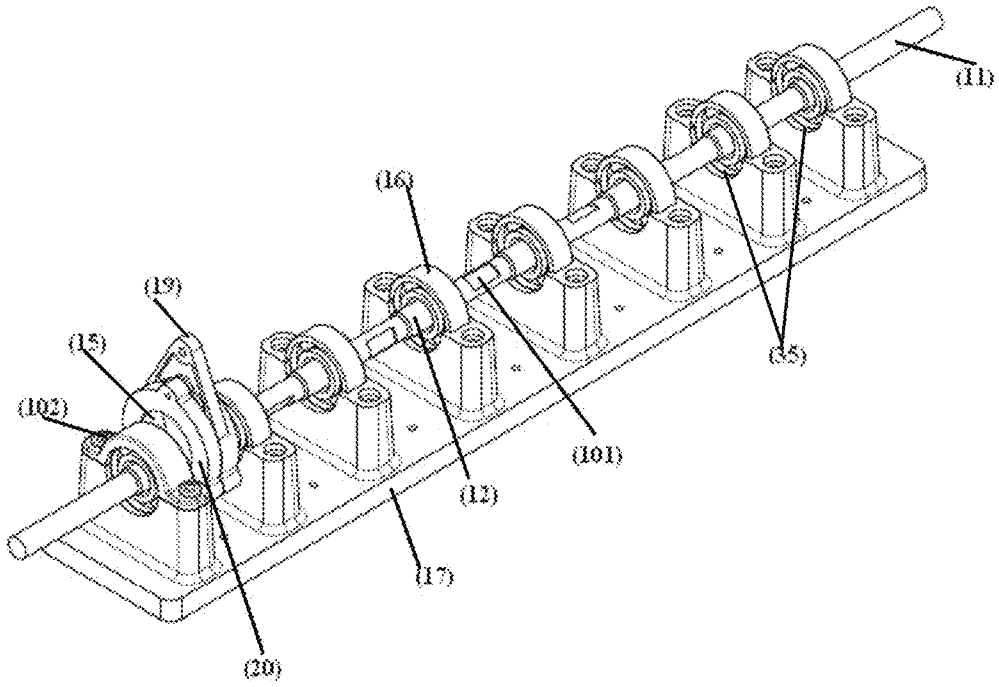
FIG. 2 is a perspective view of the single rod eccentric drive mechanism showing established on base strip of shaft house according to the present invention.

FIG. 2 describes perspective view of the single rod eccentric drive mechanism according to the present invention, the FIG. 2 shows the shaft (11) along with the bearing (16) and needle roller housing (19) is mounted on a base strip (17). The base strip (17) has the specific column (35) that can accommodate the bearing (16) mounted on the ring (12) of the shaft (11) with a clamp (102) in serial arrangement that corresponds to the ring (12) of the shaft (11) arrangement shown in FIG. 1(*a-b*). The base strip (17) has column (35) that gives perfect spacing for needle roller housing (19) that sandwiched between corresponding the bearing (16). The base strip (17) has provided with the clamp (102) fastening means that strictly limit the movement of the bearing (16) in confined area of column (35). The base strip (17) provides axial rotation of the shaft (11) that corresponds eccentric movement of the needle roller housing (19) in vertical or horizontal movement between the corresponding gap in column (35) of the base strip (17). The needle roller housing (19) movement depend upon the eccentric cam assembly (15), the accentrisizations is suppose 15 or 16 mm than the needle roller housing (19) will move 8 mm upward and 8 mm downward. Furthermore, according to the present invention, there is a space in the base strip (17) when the needle roller housing (19) is 8 mm downward. It is submitted that FIG. 2 contains the needle roller housing (19) accommodating 0° cam assembly (15). The rest of the column gap kept vacated for the purpose of illustration.

Figure 3:
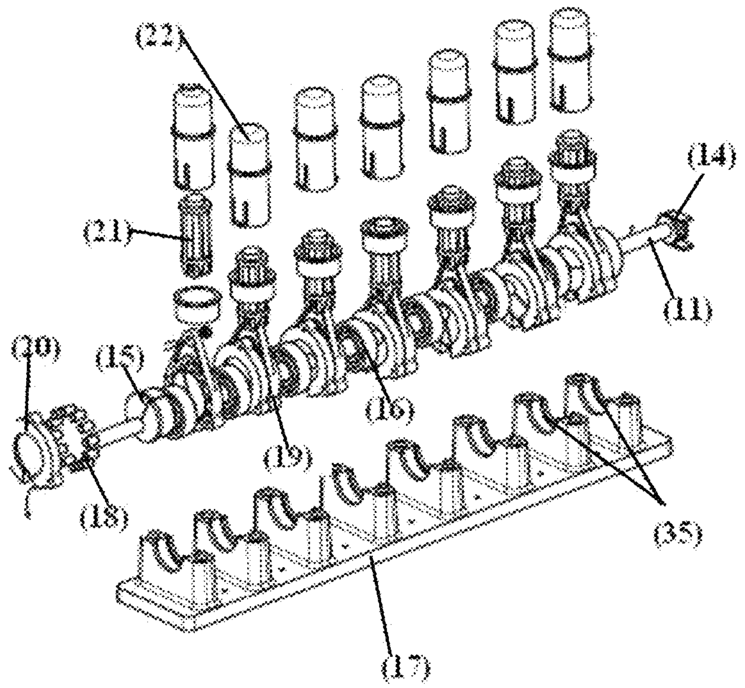
FIG. 3 is an exploded view of the shaft having various embodiments of the present invention.

FIG. 3 describes an exploded view of established system on the base strip (17) of the present invention where the needle roller housing (19) is fixed with linear leaver (21) with the help of pivotal joint and the linear leaver (21) is mounted with dome bush (22). The linear leaver (21) and dome bush (22) are arranged on the needle roller housing (19) in such way that it will create continuous synchronize wave motion in the device. This embodiment is configured by user as per the pain relief requirement of the user. The dome bush (22) can be modified for the final attachment as described in FIG. 9 for the massage means. The length of bush can be varies depending on the anatomical and/or preferential mode of massage by the user.

In a most preferred embodiment, the plurality of needle roller housing (19) has a unique phase/degree so that at least one needle roller housing (19) is 45° out of phase/degree with the following needle roller housing (19) on the shaft (11) in such a way that the plurality of needle roller housing (19) defines a total phase/degree of 360° from the vertical as shown in FIG. 3. In other words, the rotation of shaft (11) in one circle is equal to 0° to 360° to provide continuous synchronize oscillation wave motion. A specific vertical difference of 8-15 mm is maintained when at least one needle roller housing (19) is at lowest position and the following needle roller housing (19) is at top most position. Each needle roller housing (19) provide easy synchronize wave oscillation motion treatment to the user. The pattern of needle roller housing (19) is designed to provide smooth rotation on the shaft (11) which provide constant synchronize wave motion massage to the user for the long time duration. The motor (13) at one end of the massager drive shaft (13) with gear (103) box at the back box and simultaneously it drives the timing pulley (14) or timing belt. The durability of single rod eccentric drive mechanism is long lasting for the user.

Figure 4:
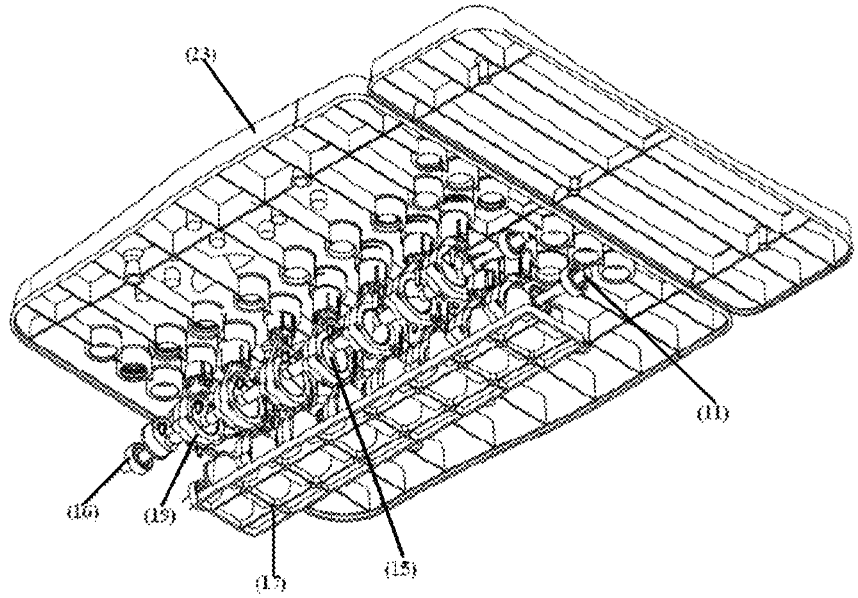
FIG. 4 is an underside view of single rod eccentric drive mechanism to provide synchronize wave oscillation treatment.

FIG. 4 describes the bottom side view of the shafts (11) where two parallel shafts (11) with plurality of needle roller housing (19) are placed for providing continuous synchronize wave oscillation treatment. The two parallel shafts (11) with plurality of needle roller housing (19) are cemented with the board (23) and same illustrates in FIG. 5 in more detail, it shows the side view of the shaft (11) to provide synchronize wave oscillation treatment as mention in FIG. 4. The FIG. 4 provides two base strip (17), are placed parallel to each other and fixed in one base box i.e. housing (30) (shown in FIG. 6), rotates in synchronize single rod (17) connected to gears (103) along with motor (13). The system provides single motor driven dual shaft rotation that simultaneously provides massage at dual parallel knobs.

Figure 5:
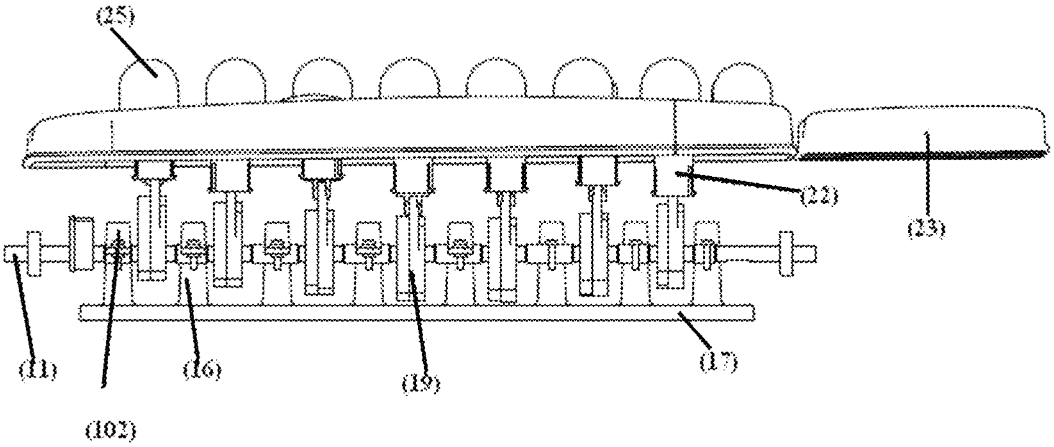
FIG. 5 is a perspective side view of a single rod eccentric drive mechanism to provide synchronize wave oscillation treatment mention in FIG. 4.

In FIG. 5 it describes the vertical view of the system, includes the base strip (17) on which the shaft is accommodate with plurality of needle roller housing (19) and each of the bearing (16) is mounted on other side of the needle roller housing (19). The needle roller housing (19) is accommodating with the board (23). The board (23) have plurality of a static knob (25) to provide massaging effect to the user. In preferred embodiment, it describes one period of the synchronize wave oscillation treatment by single rod eccentric drive mechanism and it shows the relative positions/angles of the plurality of needle roller housing (19).

As seen in FIG. 5, the plurality of needle roller housing (19) is at different angles from the vertical. The needle roller housing (19) are interleaved at equal phase intervals so as to produce the synchronize wave in the up and down panel. So that a complete waves passes during each full rotation of the shaft (11). FIG. 5 also shows the individual positions/angles of the different/single needle roller housing (19) over one wave period. It also shows how a device with a varying wavelength along its length can be generated from a single mechanism.

The mechanism in above mentioned FIG. 4 and FIG. 5 is placed in to housing (30) and at the top accommodate with a linear plate (24). The linear plate (24) has ample number of holes. The holes are designed more specifically to accommodate the mechanism as shown in FIG. 6.

Figure 6:
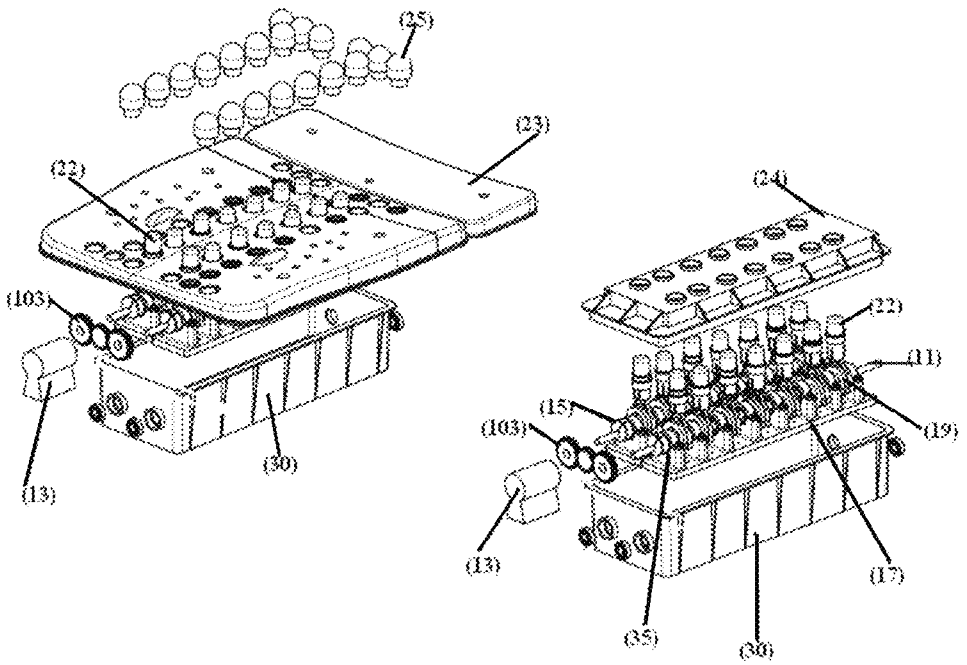
FIG. 6 is an exploded top view of board, a heating dome and showing various parts in accordance with the embodiment of the present invention.

In most preferred embodiment of the FIG. 6, it describes an exploded top view of the board (23). The board (23) includes an oscillating knob (22), a heat realising static knob (32) and a magnetic static knob (25). The heat realising static knob (32) and the magnetic static knob (25) worked to support the oscillating knob (22) for long and constant massaging to the user. In preferred embodiment, the oscillating knobs (31) uplift the body than the pressure comes on the body of the user at the same time the oscillating knobs (31) gives massaging to the user and vice versa when the oscillating knobs (31) are at downward position than the heat realising static knob (32) and magnetic static knob (25) provide the acupressure massage to the user body.

The magnetic static knob (25) and oscillating knob (31) are made up of rubber and plastic material. The T.P.E is used for rubber softness knobs and the heat realizing static knob (32) is made up of poly carbonate that is used for transparent plastic. The knobs (25, 31 and 32) are reciprocates through hole provided on the convex surface of the board (23). The board (23) has plurality of holes for connecting the knobs (25, 31 and 32) on top of the mechanism. The board (23) is shown with a hole spaced from the perimeter of the mechanism. Such reciprocation of the knobs (25, 31 and 32) through the hole of the board connected with the mechanism provides cushioning and massages effect to the person s/patients/human/user and the mechanism are arranged inside a bed in such a way that it will create synchronize wave oscillation motion treatment and heating massage to the whole body as illustrated further in FIG. 7.

Figure 7:
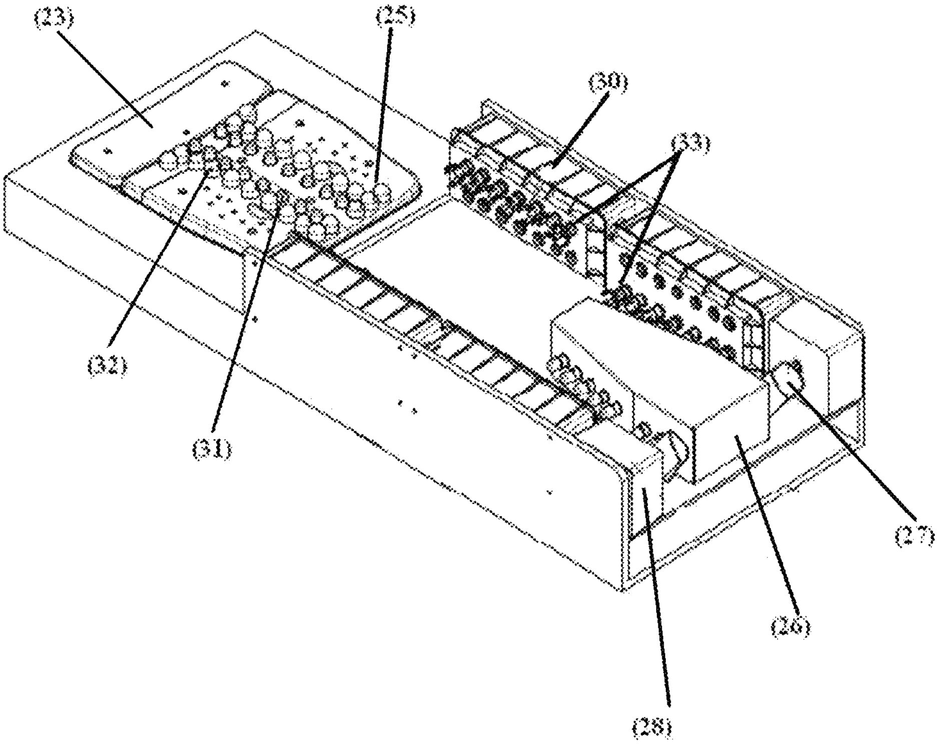
FIG. 7 is a partial breakaway view of the inside of the bed, illustrating another alternative embodiment of the synchronize wave oscillation treatment and showing spring box combined with the foot dome on a heating element.

FIG. 7 is a partial breakaway view of the inside of the bed, illustrating the mechanism with another alternative embodiment of the present invention includes static spring box (26) combined with the foot dome (27) and a four way dome (33). FIG. 7 shows the wave bed with the mechanism, it shows joining and transmitting mechanism sets from top to bottom/whole body on the bed. The bed has two motors (13), one motor (13) is on top at head portion of the user and second motor (13) is on foot. The motors (13) will create drive kind of movement to back massage/whole body device. The mechanism works in the vertical and horizontal manner on bed to provide the user cushioning and percussive massages effect in the synchronize wave oscillation treatment on the thigh and calf muscle through suitable arrangement of a driving means, a rotating means, supportive means and massaging means. The mechanism are located on thigh and bottom leg/calf muscle of the bed in the foot area so that the user can get the synchronize wave oscillation treatment on the whole body.

In preferred embodiment, the four way dome (33) is used in the mechanism which located on the thigh and bottom leg of the bed. The static spring box (26) adjacent with the foot dome (27) provides easy and simple massaging in the way of wave motioning to the leg of the user. The static spring box provides base platform for the four way dome (33) or foot way dome (27). The static spring box (26) contains mechanism which works in the horizontal manner on the bed, so the user/human/person/patient get cushioning and massages effect in the synchronize wave oscillation treatment on the foot/leg. The foot dome (27) and heating element (28) on the bed provides the massage effect to the foot of the user. The universal joint (29) has been provided between lower foot and foot dome (27) at the angle 135° which gives non linear momentum converter for relatively different plane arrangements.

Figure 8:
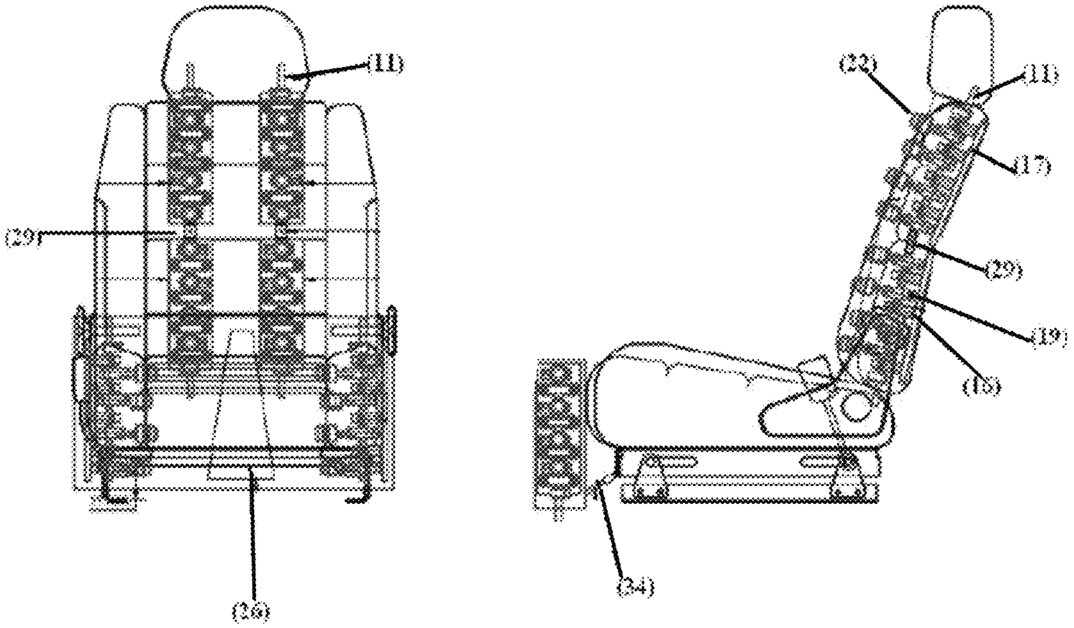
FIG. 8 shows the perspective view of another alternative embodiment of a chair type massager with single rod eccentric drive mechanism to provide synchronize wave oscillation treatment according to the present invention.

Referring to FIG. 8, a wave chair constructed according to the present invention. Another alternative embodiment of a chair type massager with single rod eccentric drive mechanism to provide synchronize wave oscillation treatment comprises a back rest portion, a seat portion and a universal joint (29).

FIG. 8 shows the wave chair with the mechanism, (similar in structure to eccentric drive mechanism as mention above in FIGS. 4, 5 and 6) two sets of mechanism provide on the back rest portion of the chair. Furthermore, the back rest of the chair is not parallel so to adjust the back rest of the chair as per user requirement provides the universal joint (29) for easy and flexible movement of the back rest for massaging effect. The universal joint (29) is a mechanical connection between rotating shafts, which are usually not parallel, but intersecting. The universal joint (29) is a connection point allowing the smooth and used to transmit motion. Set of mechanism include four needles rollers housing (19) and respectively connected with the universal joint (29) in one set as per FIG. 8. The chair could also be constructed similar to bed as shown in FIG. 6.

The one motor (13) can be located on the back portion of the head and second motor (13) can be located under the seat portion as shown in FIG. 8. The mechanism is also provided to the feet so that the device essentially give massage in the direction of the synchronize wave oscillation to the user on the leg/feet. In most preferred embodiment, the feet portion can be adjustable as per user height or requirements by air spring (34). The air spring (34) is connected with frame of the seat portion and with the mechanism as shown in FIG. 8.

Figure 9:
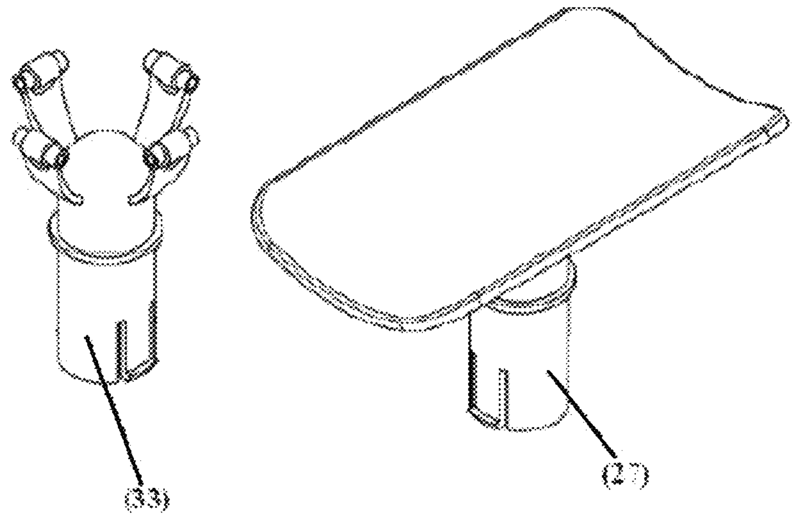
FIG. 9 illustrates the exploded view of the four way dome (33) and foot dome (27) with special small dome for massage chair having short length as mentioned in FIG. 7 of the present invention.

FIG. 9 illustrates the exploded view of the four way dome (33) and foot dome (27) as mentioned in FIG. 7 of the present invention. The four way dome (33) is used for massaging the thigh and the bottom leg portion of the user as shown in FIG. 7. The foot dome (27) is used for massaging the feet area of the user.

Figure 10:
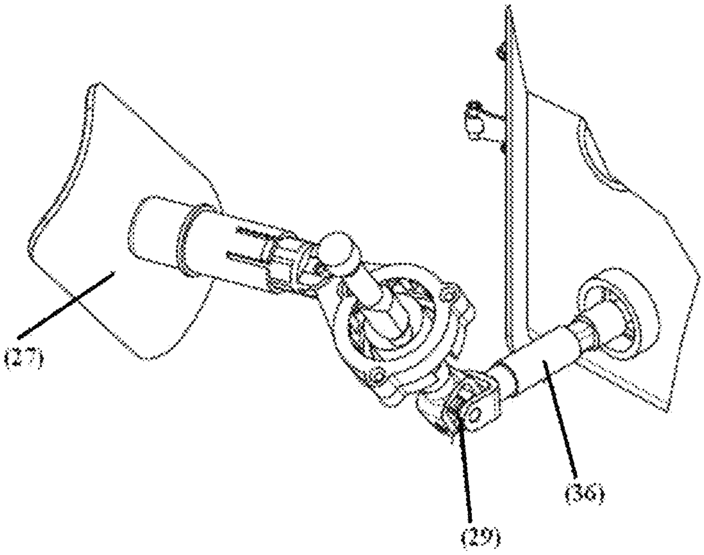
FIG. 10 illustrates the enlarged view of another embodiment a universal joint of the present invention.
Figure 10I:
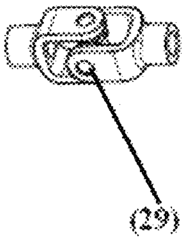

FIG. 10 illustrates the enlarged view of the universal joint (29) as mentioned in FIG. 8 of the present invention the universal joint (29) or coupling used for connecting rigid rods whose axes are inclined to each other, and is used in shafts (11) that transmit rotary motion. FIG. 10(*i*) provides perspective view of universal joint and the same is provided with the embedded assembly in FIG. 10. The assembly provides spline joint (36) for the purpose of adjusting lengths for incorporation of universal joint in two shafts. FIG. 10 provides arrangement of foot dome (27) arrangement at 135° inclined compared to adjacent shaft (11) arrangement for push and relax massage means at foot region. The universal joint (29) is a connection between rotating shaft (11), which are usually not parallel, but intersecting. The universal joint (29) allows drive shaft (11) which is in different plane to move up and down motion simultaneously as shown in FIG. 8.

The present invention provides easy to use device for pain relief through wave oscillation treatment by just lying down on the device. The user utilizes the device, as shown in one embodiment, as illustrated in FIG. 7, by placing the device on a support surface. The user places back body area or any specific point onto the tool's upright knobs (25, 31 and 32) supported by a board (23) that is adjusted to provide many possible arrangements. The user can massage a body area utilizing body weight and gravity simply by laying, leaning, resting on the device as needed to bring attention to the area allowing the user the ability to apply a sustained focused pressure, for as long as they want as per the users convenience.

The main advantage of the present invention is that it provides cushioning and heating massages effect on the back/body pain relief treatment.

The another advantage of the present invention is that it provides simple, easy to used professionally or at home, without human or mechanical assistance.

The further advantage of the present invention is to provide device which doesn't require electricity and adjustable as per the origin of the back pain.

Although the preferred embodiment as well as the preparation and use have been specifically described, it should be understood that variations in the preferred embodiment could be achieved by a person skilled in the art without departing from the spirit of the invention. The invention has been described with reference to specific embodiments which are merely illustrative and not intended to limit the scope of the invention as defined in the claims.

| List of Reference numerals | |
|---|---|
| 11 | shaft |
| 12 | Rotatable ring |
| 13 | motors |
| 14 | timing belt pulley |
| 15 | CAM Assembly |
| 16 | Bearing |
| 17 | Base strip |
| 18 | Needle |
| 19 | Needle roller housing |
| 20 | Cap |
| 21 | linear leaver |
| 22 | Dome bush |
| 23 | Board |
| 24 | Guide plate |
| 25 | Magnetic static knob |
| 26 | Static Spring box |
| 27 | Foot Dome |
| 28 | Heating element |
| 29 | Universal joint |
| 30 | Housing |
| 31 | Oscillating knob |
| 32 | Heat realizing static knob |
| 33 | Four way dome |
| 34 | Air spring |
| 35 | column |
| 36 | Spline joint |
| 101 | Angular grooves |
| 102 | Clamp |
| 103 | Gear |

I claim:

1. A massager having a single rod eccentric drive mechanism to provide synchronize wave oscillation treatment, the massager comprising, a driving means includes at least one motor to provide working force in the massager; at least one gear is attached to a corresponding motor shaft of the at least one motor, at least one timing pulley to guide the corresponding motor shaft in the massager;

a rotating means includes at least one shaft with serial repetitive arrangement of rings and at least one angular groove slanted at one selected degree; at least one cam assembly with two corresponding half circular cam parts, the two corresponding half circular cam parts are joined at a joint and are established on a respective slanted angular groove of the at least one angular groove to complete the at least one cam assembly; at least one bearing is configured to accommodate the at least one shaft at a ring of the serial repetitive arrangement of rings; and at least one of a needle roller housing with a dedicated roller in a close proximity to a corresponding cam assembly at a position;

a massaging means includes at least one set of knobs to provide percussive massage on a body of the user, at least one linear leaver is pivotal mounted, and the linear leaver interfaces with a dome bush;

a supportive means includes a base strip to accommodate the bearing and the needle roller housing at intervals by way of a column; a board having a set of static knobs and/or a set of heating knobs are configured to contact the body of a user at one position, wherein the angular grooved shaft in a conjugation with the cam assembly and the needle roller housing provide conversion of axial rotational movement of the motor driven shaft to eccentric vertical movement in a form of synchronize percussive wave oscillation treatment through relatively different vertical position of the at least one set of knobs of the massaging means on an upper side of the board.

2. The massager with the single rod eccentric drive mechanism to provide synchronize wave oscillation treatment as claimed in claim 1 comprises bed or chair, for back and/or leg massage, in combination of vertical and/or horizontal percussive massage arrangement.

3. The massager with the single rod eccentric drive mechanism to provide synchronize wave oscillation treatment as claimed in claim 1, wherein the at least one angular groove comprise a plurality of angular grooves, wherein the plurality of grooves comprising angular positions of 0°, 45°, 90°, 135°, 180°, 225°, 270° and/or 315° on the slanted groove shaft, in combination with the cam assembly and the needle roller housing provides synchronize wave oscillation percussive massage in vertical and horizontal directions through suitable arrangement of the driving means, the rotating means, the supportive means and the massaging means.

4. The massager with the single rod eccentric drive mechanism to provide synchronize wave oscillation treatment as claimed in claim 1, includes a static spring box that works in a horizontal manner on a bed to provide a user a cushioning and a percussive massages effect in the synchronize percussive wave oscillation treatment on a thigh and/or a calf muscle.

5. The massager with the single rod eccentric drive mechanism to provide synchronize wave oscillation treatment as claimed in claim 1, wherein the set of knobs of the massaging means, the set of static knobs and the set of the heating knobs include a heating knob, a rubber knob, and/or a magnetic knob.

6. The massager with the single rod eccentric drive mechanism to provide synchronize wave oscillation treatment as claimed in claim 5, includes a foot dome is used for massaging a feet area and/or a calf muscle of the user and, a four way dome used for massaging a thigh and/or a bottom leg portion of the user and both the foot dome and the four way dome provides a wave massaging motion to the calf muscle and/or the leg of the user.

7. The massager with the single rod eccentric drive mechanism to provide synchronize wave oscillation treatment as claimed in claim 1, further comprising a universal joint junction and a non-linear shaft, the universal joint junction is configured to transmit rotational movement from the driving means to the non linear shaft.

* * * * *